US012749407B2

(12) United States Patent

Hara et al.

(10) Patent No.: US 12,749,407 B2

(45) Date of Patent: Sep. 29, 2026

(54) ROUTE GENERATION DEVICE

(71) Applicant: Yanmar Power Technology Co., Ltd., Osaka (JP)

(72) Inventors: Naohiro Hara, Osaka (JP); Tomoya Fukukawa, Osaka (JP); Yuichiro Dake, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 637 days.

(21) Appl. No.: 17/296,950

(22) PCT Filed: Nov. 26, 2019

(86) PCT No.: PCT/JP2019/046102

§ 371 (c)(1),
(2) Date: May 25, 2021

(87) PCT Pub. No.: WO2020/111040

PCT Pub. Date: Jun. 4, 2020

(65) Prior Publication Data

US 2022/0028278 A1 Jan. 27, 2022

(30) Foreign Application Priority Data

Nov. 27, 2018 (JP) ................................ 2018-221041

(51) Int. Cl.

| | |
|---|---|
| ***G08G 3/00*** | (2006.01) |
| ***B63B 49/00*** | (2006.01) |
| ***B63B 79/40*** | (2020.01) |

(52) U.S. Cl.

CPC ............... *G08G 3/00* (2013.01); *B63B 49/00* (2013.01); *B63B 79/40* (2020.01); *B63B 2213/00* (2013.01)

(58) Field of Classification Search

CPC ..... B63B 49/00; B63B 79/40; B63B 2213/00; G08G 3/00; G08G 3/02; G05D 1/0206; B63H 25/42

(Continued)

(56) References Cited

U.S. PATENT DOCUMENTS 7,389,735 B2 * 6/2008 Kaji ........................ B63B 21/00 114/230.1
10,322,787 B2 * 6/2019 Ward ..................... B63H 25/04

(Continued)

FOREIGN PATENT DOCUMENTS

AU 2017277083 A1 * 1/2019 ............... F03D 9/18
EP 3549852 B1 * 7/2021 ............ B63H 25/02

(Continued)

OTHER PUBLICATIONS

Quasi Real-Time Optimal Control Scheme for Automatic Berthing by Naoki Mizuno et al., ScienceDirect IFAC—PapersOnLine 48-16 (2015) 305-312 (Year: 2015).*

(Continued)

*Primary Examiner* — Cuong H Nguyen

(74) *Attorney, Agent, or Firm* — Chris Mizumoto

(57) ABSTRACT

According to the present invention, a route controller generates a route that makes a ship dock at a berthing facility. The route includes a first location and a second location (P2). The first location is a via point that is offset a prescribed distance in a direction that is orthogonal to the direction in which the berthing facility is oriented from a docking point for the ship at the berthing facility. The second location is the docking point for the ship at the berthing facility. The first location is immediately before the second location in the sequence to be realized by the ship. The route is generated such that the ship remains oriented in the (Continued)

direction in which the berthing facility is oriented as the ship moves from the first location to the second location.

9 Claims, 6 Drawing Sheets

(58) Field of Classification Search
USPC ............................................. 701/21; 342/23
See application file for complete search history.

(56) References Cited

U.S. PATENT DOCUMENTS

| | | | | |
|---|---|---|---|---|
| 10,324,468 | B2 * | 6/2019 | Arbuckle | B63B 79/20 |
| 10,429,845 | B2 * | 10/2019 | Arbuckle | B63H 21/21 |
| 11,029,686 | B2 * | 6/2021 | Tyers | G01C 21/203 |
| 11,385,060 | B2 * | 7/2022 | Yamazaki | G05D 1/0206 |
| 11,556,130 | B2 * | 1/2023 | Tyers | G05D 1/0206 |
| 11,597,488 | B2 * | 3/2023 | Murata | B63H 25/24 |
| 2019/0162167 | A1 * | 5/2019 | Gonzalez Perez | F03D 9/25 |

FOREIGN PATENT DOCUMENTS

| | | | | | |
|---|---|---|---|---|---|
| EP | 3889030 | B1 * | 12/2025 | | B63B 49/00 |
| JP | 2005-255058 | | 9/2005 | | |
| JP | 5000244 | B2 * | 8/2012 | | B63B 21/00 |
| JP | 2016-083974 | | 5/2016 | | |
| JP | 2018-086988 | | 6/2018 | | |
| JP | 2020040470 | A * | 3/2020 | | B63B 49/00 |
| JP | 6696704 | B2 * | 5/2020 | | B63B 79/15 |
| JP | 2020083090 | A * | 6/2020 | | B63H 25/42 |
| JP | 7199935 | B2 * | 1/2023 | | B63B 79/40 |
| WO | WO-2018100750 | A1 * | 6/2018 | | G05D 1/0206 |
| WO | WO-2020111040 | A1 * | 6/2020 | | G05D 1/0206 |

OTHER PUBLICATIONS

"Safer and More Efficient Ship Handling with the Pivot Point Concept" by S.G. Seo; Southampton Solent University, Southampton, UK; from Transnav, http://www.transnav.eu, vol. 10, No. 4, Dec. 2016 (Year: 2016).*

Okazaki, Tadatsugi, and Kohei Ohtsu. "A study on ship berthing support system—Minimum time berthing control." 2008 IEEE International Conference on Systems, Man and Cybernetics. IEEE, (Year: 2008).*

Martinsen, Andreas B., et al. "Optimization-based automatic docking and berthing of ASVs using exteroceptive sensors: Theory and experiments." IEEE Access 8 (2020): 204974-204986. (Year: 2020).*

Skjåstad, Ketil Grav. An abstract of Automated berthing (parking) of autonomous ships. MS thesis pp. 1-22 . NTNU, 2018. (Year: 2018).*

Gauslaa, Elias. An abstract of Navigation, guidance, and control for autonomous docking of ships. MS thesis pp. 1-7. NTNU, 2020. (Year: 2020).*

An English-translated version of WO-2018100750-A1 by Akuzawa, Shu et al. (Year: 2018).*

Perkovič, Marko, et al. "Laser-based aid systems for berthing and docking." Journal of marine science and engineering 8.5 (2020): 346. (Year: 2020).*

State-of-the-Art Review and Future Perspectives on Maneuvering Modeling for Automatic Ship Berthing by Song Zhang et al; J. Mar. Sci. Eng. Sep. 19, 2023, 11(9), 1824.*

Investigation on a Novel Support System for Automatic Ship Berthing in Marine Practice by Van Suong Nguyen, . Mar. Sci. Eng. Apr. 22, 2019, 7(4), 114.*

Im, N.K.; Nguyen, V.S. Artificial neural network controller for automatic ship berthing using head-up coordinate system. Int. J. Nav. Archit. Ocean Eng. 2018, 10, 235-249.*

Nguyen, V.S.; Do, V.C.; Im, N.K. Development of Automatic Ship Berthing System Using Artificial Neural Network and Distance Measurement System. Int. J. Fuzzy Log. Intell. Syst. 2018, 18, 41-49.*

A Study on Ship Berthing Support System—Minimum Time Berthing Control (Oct. 2008) by Okazaki and Ohtsu from Tokyo University of Marine Science and Technology, Tokyo, Japan.

* cited by examiner

ROUTE GENERATION DEVICE

CROSS-REFERENCE

This application is a US National Stage Application under 35 U.S.C. § 371 of International Application No. PCT/JP2019/046102 filed Nov. 26, 2019, which claims foreign priority of JP2018-221041 filed Nov. 27, 2018, the disclosures of which are hereby incorporated by reference in their entirety.

TECHNICAL FIELD

The present invention relates to a route generation device that generates a route of a ship.

BACKGROUND ART

A ship steering system for use in automatic docking of a ship is conventionally known. Patent Literature 1 discloses a small-sized ship equipped with such ship steering system.

The small-sized ship in Patent Literature 1 includes a controller. The controller sets, among positions along a docking location, the closest position in a current bow direction as the first target position. In addition, the controller determines a position separated from the first target position by an offset amount in a direction perpendicular to an edge of the docking location as the second target position. Then, the controller controls a propulsion apparatus so as to make the small-sized ship reach the second target position. Subsequently, the controller controls the propulsion apparatus so as to make the small-sized ship reach the first target position.

The small-sized ship is controlled according to approach control if the distance from a current position to the first target position is of a value exceeding a specified threshold. On the other hand, the small-sized ship is controlled according to adjustment control if the distance from the current position to the first target position is of a value equal to or less than the specified threshold.

In the approach control, the controller determines a target thrust and a target steering angle of the propulsion apparatus based on the first target speed (target speed in the longitudinal direction of the hull) and a target angular velocity (target angular velocity of the hull). In the adjustment control, the target thrust and the target steering angle of the propulsion apparatus are determined based on the first target speed, the second target speed (target speed in the lateral direction of the hull), and the target angular velocity.

The controller reduces the target speed as the current position of the hull comes closer to the first target position. When the distance between the current position of the hull and the first target position falls within a specified range including zero, the controller sets the target speed to zero. Moreover, the controller reduces the target angular velocity as a current bearing of the hull comes closer to a target bearing (bearing of the hull at the docking location). When the difference between the current bearing of the hull and the target bearing falls within a specified range including zero, the controller sets the target angular velocity to zero.

CITATION LIST

Patent Literature

Patent Literature 1: WO 2018/100749

DISCLOSURE OF INVENTION

Problems to be Solved by the Invention

Since the configuration in Patent Literature 1 carries out control so as to make the bearing of the ship coincident with the target bearing (namely, the bearing of the ship in the first target position) while bringing the ship closer to the first target position, an actual movement locus of the ship during the automatic docking may curve off under the influence of the angular velocity, for instance. For this reason, the automatic docking of the ship may not be achieved with high accuracy, which leaves room for improvement.

The present invention has been made in view of the conditions as above and is aimed at providing a route generation device capable of generating a route allowing automatic docking of a ship with high accuracy.

MEANS FOR SOLVING THE PROBLEMS AND EFFECT OF THE INVENTION

The problems to be solved by the present invention are as described above, and the means for solving such problems and effects of the means are next described.

According to an aspect of the present invention, a route generation device with the following configuration is provided. In other words, the route generation device generates a route allowing a ship to dock at a berthing facility. The route includes a first position and a second position. The first position is a position displaced from a docking position for the ship in the berthing facility by a specified distance in a direction perpendicular to a direction of the berthing facility. The second position is the docking position for the ship in the berthing facility. The route is generated so that the ship moves from the first position to the second position while maintaining a bearing of the ship in a direction along the berthing facility.

Such configuration allows the ship to come closer to the second position from the first position perpendicularly to the direction of the berthing facility while making the bearing of the ship coincident with the direction along the berthing facility. Consequently, the automatic docking of the ship is achieved with high accuracy while reducing the possibility of collision against the berthing facility.

The route generation device as above preferably has the following configuration. In other words, the route is so generated as to link a plurality of positions. The first position is immediately before the second position on the route in an order to be fulfilled by the ship.

Such configuration makes it possible to fulfill a simple route for automatic docking.

The route generation device as above preferably has the following configuration. In other words, the route includes one or more intermediate positions. The intermediate positions precede the first position in the order to be fulfilled by the ship. The route generation device is capable of generating the route while changing a bearing setting mode. The bearing setting mode includes a pivotal turn before parallel movement mode and a turn with movement mode. In the pivotal turn before parallel movement mode, the ship having reached the intermediate positions pivotally turns in the intermediate positions so as to cause the bearing of the ship to agree with a bearing to be fulfilled by the ship in a next position and moves to the next position while maintaining a bearing after turning. In the turn with movement mode, the ship having reached the intermediate positions turns concurrently with movement from the intermediate positions to the next position so as to cause the bearing of the ship to agree with the bearing to be fulfilled by the ship in the next position.

Such configuration makes it possible to generate a route allowing the automatic docking of the ship while making a change from the parallel movement after completion of a turn to the movement with a turn, or vice versa according to circumstances.

The route generation device as above preferably has the following configuration. In other words, the bearing setting mode includes a pivotal turn before forward movement mode. In the pivotal turn before forward movement mode, the ship having reached the intermediate positions pivotally turns in the intermediate positions so as to cause the bearing of the ship to agree with a bearing directed to the next position and moves to the next position while maintaining a bearing after turning.

Such configuration makes it possible to generate a route allowing the automatic docking of the ship while carrying out the forward movement after completion of a turn according to circumstances.

In the route generation device as above, the bearing setting mode may be changed based on at least a direct distance between the intermediate positions and the second position or a direct distance between the intermediate positions and the first position.

In the route generation device as above, the bearing setting mode may also be changed based on at least a distance on the route between the intermediate positions and the second position or a distance on the route between the intermediate positions and the first position.

Such change in bearing setting mode makes it possible to change the method of setting the bearing of the ship between an ending phase of the automatic docking that needs a high-accuracy control of the bearing of the ship and a phase preceding the ending phase.

In the route generation device as above, the bearing setting mode is preferably changed based on at least a magnitude of change of a direction of the route in the intermediate positions.

Such change in bearing setting mode makes it possible to prevent a movement locus of the ship from considerably coming off the route even if the route sharply bends in an intermediate position.

The route generation device as above preferably includes a display data generation unit that generates display data for displaying, with a figure, the first position and the second position as well as directions to be fulfilled by the ship in the first position and the second position, respectively.

Such configuration allows a user to readily grasp the behavior of the ship involved in the automatic docking by checking the display.

DESCRIPTION OF EMBODIMENTS

Figure 1:
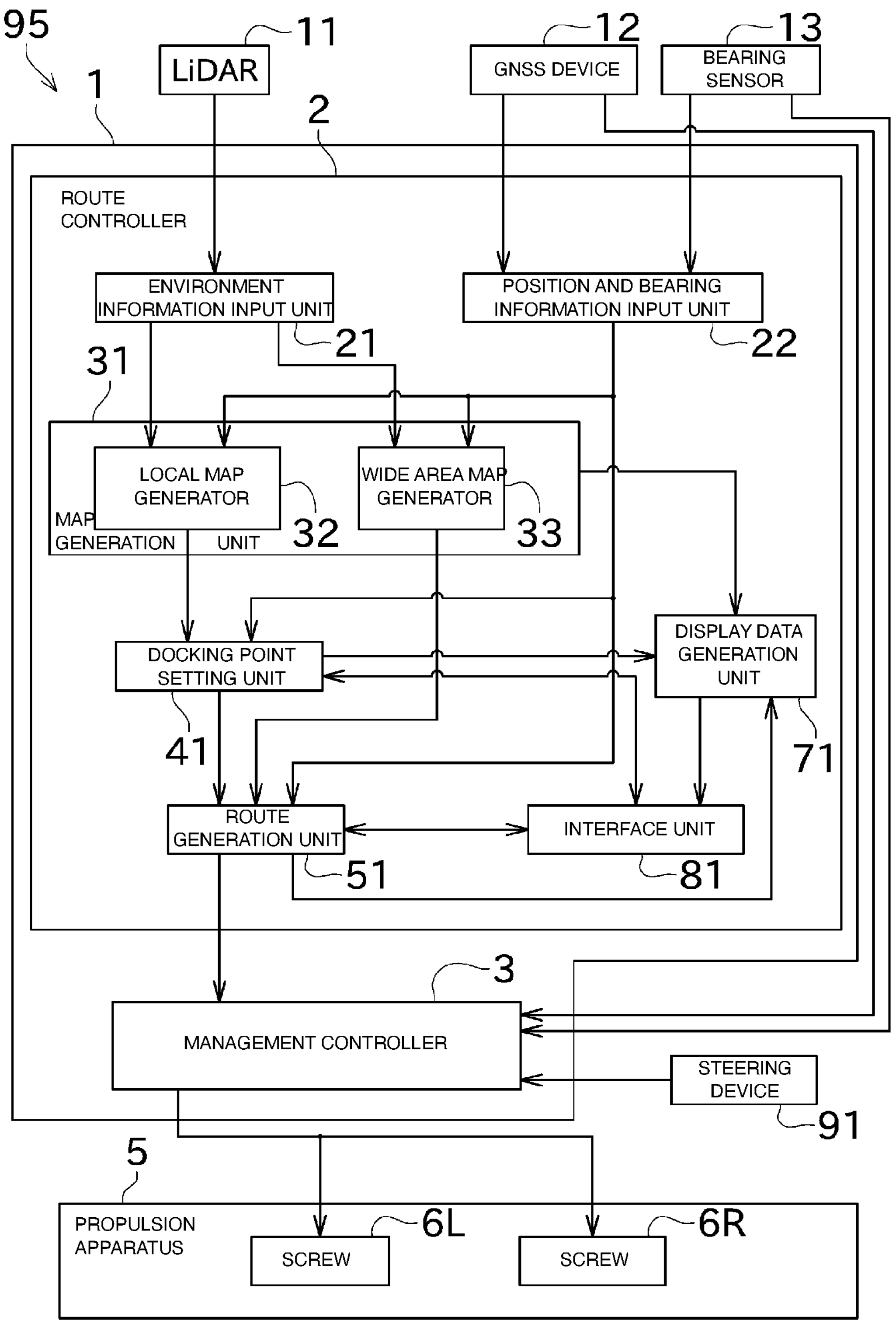
FIG. 1 is a block diagram illustrating an electric configuration of a ship steering management system according to an embodiment of the present invention.

The next description is made on an embodiment of the present invention with reference to the drawings. FIG. 1 is a block diagram illustrating an electric configuration of a ship steering management system 1 according to an embodiment of the present invention.

The ship steering management system 1 illustrated in FIG. 1 is loaded to use on a ship 95. The ship steering management system 1 allows automatic navigation of the ship 95. The automatic navigation includes automatic docking of the ship 95.

In the present specification, "docking" includes bringing the ship 95 up at a berthing facility. The "berthing facility" refers to a place where a ship can be brought up, and it does not matter whether the berthing facility is a natural object or an artificial object. Examples of the berthing facility include a quay, a wharf, a pier, and a floating pier.

The ship 95, to which the ship steering management system 1 is applied, is not particularly limited in structure but may be exemplified by a pleasure boat, a fishing boat, a water jet ship, an electric propulsion ship or a hybrid ship.

The ship 95 is equipped with a propulsion apparatus 5.

The propulsion apparatus 5 includes a pair of screws 6L and 6R. The screws 6L and 6R are arranged on the left and right sides of the stern of the ship 95, respectively. The propulsion apparatus 5 is capable of rotating the screws 6L and 6R owing to the driving force of a driving source (engine or electric motor). The direction of the rotation axis of each of the screws 6L and 6R is changeable with respect to a vertical axis as a center. The direction of the rotation axis, the stop/normal rotation/reverse rotation, and the rotational speed of each of the screws 6L and 6R are changeable independently of one another. By controlling each of the screws 6L and 6R, the ship 95 is variously steered, that is to say, caused to make a parallel movement in a lateral direction, pivotally turn, and the like.

The screws 6L and 6R may be formed as screws of a stern drive or an outboard motor. The screws 6L and 6R may be replaced by a pair of water jets arranged on the left and right sides that are changeable in water jetting direction and speed independently of each other.

The ship steering management system 1 includes a route controller (route generation device) 2 and a management controller 3.

The route controller 2 is capable of generating a route for allowing the automatic navigation of the ship 95. The route controller 2 includes an environment information input unit 21, a position and bearing information input unit 22, a map generation unit 31, a docking point setting unit 41, a route generation unit 51, a display data generation unit 71, and an interface unit 81.

Specifically, the route controller 2 is constituted of a computer including a CPU, a ROM, and a RAM. In the ROM, a program for making the route controller 2 operate is stored. Cooperation of the hardware and software as above allows the route controller 2 to function as the environment information input unit 21, the position and bearing information input unit 22, the map generation unit 31, the docking point setting unit 41, the route generation unit 51, the display data generation unit 71, and the interface unit 81.

To the environment information input unit 21, environment data as to the surroundings that is acquired by a LiDAR 11 provided on the ship 95 is input. The LiDAR 11 is installed near the bow, for instance.

The LiDAR 11 emits a pulsed light to detect the presence or absence of an object in the surroundings based on a reflected light. If an object is present, the LiDAR 11 detects the bearing of the object and the distance to the object based on the direction of the pulsed light when the reflected light has been received and the time elapsed before the reception of the reflected light. Based on the result of such detection, the LiDAR 11 acquires point group data representing the object present in the surroundings.

To the position and bearing information input unit 22, position data as to the ship 95 that is acquired by a GNSS device 12 provided on the ship 95 is input. Also to the position and bearing information input unit 22, bearing data as to the ship 95 that is acquired by a bearing sensor 13 provided on the ship 95 is input.

The GNSS device 12 receives a GNSS wave from a satellite and performs a known positioning calculation to acquire a current position of the ship 95. While GNSS positioning may be carried out by independent positioning, the use of a known DGNSS positioning or RTK (real time kinematic) positioning is preferred because the position of the ship 95 is acquired with high accuracy.

The bearing sensor 13 acquires the direction of the bow of the ship 95. The bearing sensor 13 may be a magnetic bearing sensor or a satellite compass.

The map generation unit 31 generates an environmental map. The environmental map is a map to be used to design a route. The map generation unit 31 includes a local map generator 32 and a wide area map generator 33.

The local map generator 32 generates an environmental map of a local area including a docking position. In other words, the local map generator 32 generates an environmental map of the vicinity of a berthing facility. In the following, an environmental map generated by the local map generator 32 is also referred to as a local map.

Figure 2:
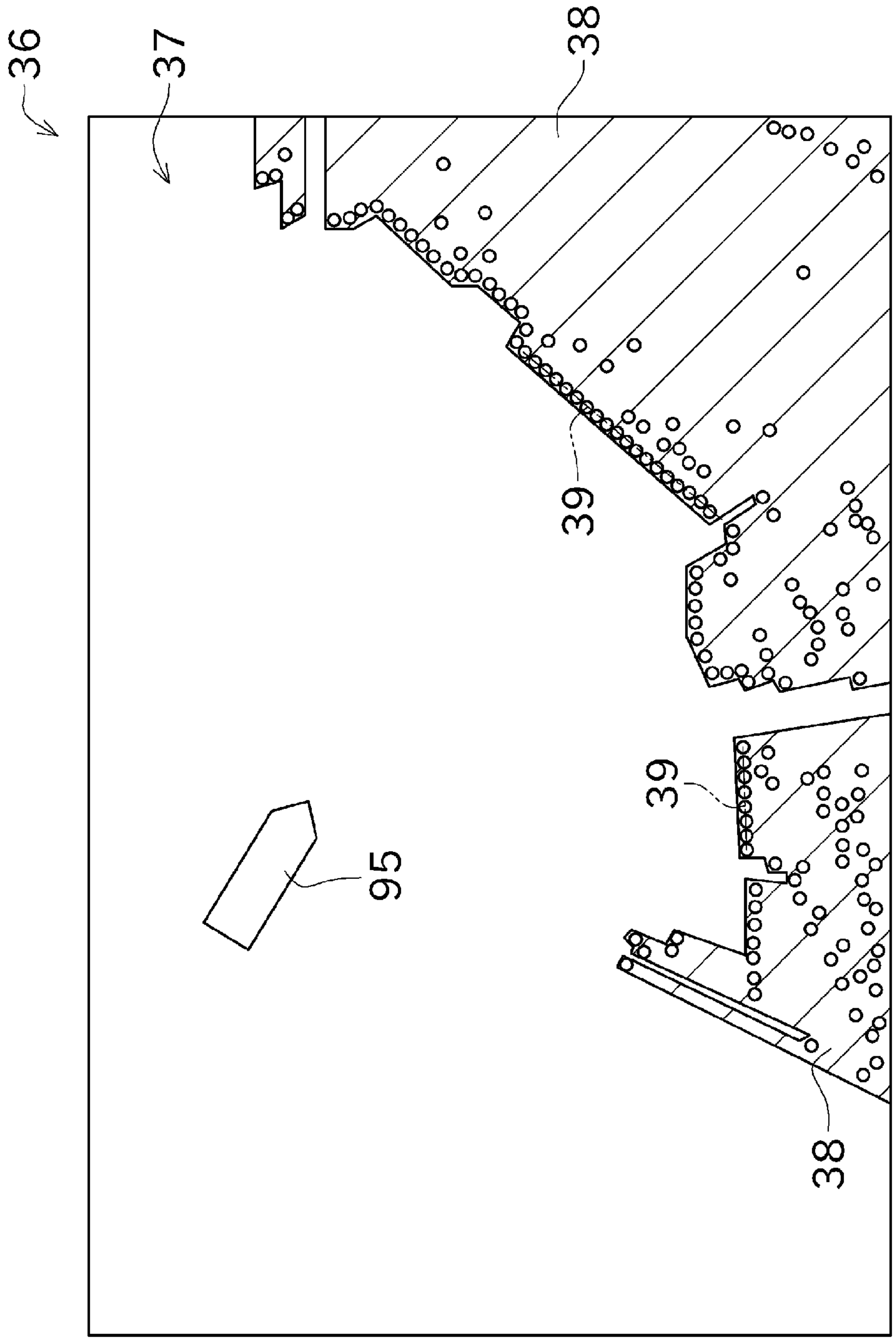
FIG. 2 is a diagram illustrating examples of an environmental map generated by a local map generation unit and a straight line detected by a docking point setting unit.

In FIG. 2, a local map 36 is illustrated as an example. In FIG. 2, the current position and direction of the ship 95 are also illustrated for convenience of description.

As illustrated in FIG. 2, the local map 36 includes the region, in which no objects are detected by the LiDAR 11 and which is consequently determined to allow the navigation of the ship 95 (namely, a free space 37). In addition, the local map 36 includes a group of points representing objects detected by the LiDAR 11. As viewed from the ship 95, a region behind the objects detected by the LiDAR 11 constitutes an occlusion region 38 where the presence or absence of an object is unknown.

The wide area map generator 33 generates an environmental map including a region beyond the range of the local map 36. In the following, an environmental map generated by the wide area map generator 33 is also referred to as a wide area map.

The wide area map, which is not illustrated, includes the region, in which no objects are detected by the LiDAR 11 and which is consequently determined to allow the navigation of the ship 95, as is the case with the local map 36.

The docking point setting unit 41 in FIG. 1 detects a candidate position for the automatic docking of the ship 95 from the local map 36. As illustrated in FIG. 2, a group of points deemed to indicate a berthing facility appear in the local map 36 as lined up in one direction in front of the occlusion region 38. The docking point setting unit 41 employs an appropriate computation algorithm so as to detect a straight line 39 extending along the group of points. The straight line 39 represents the direction of the berthing facility.

Figure 5:
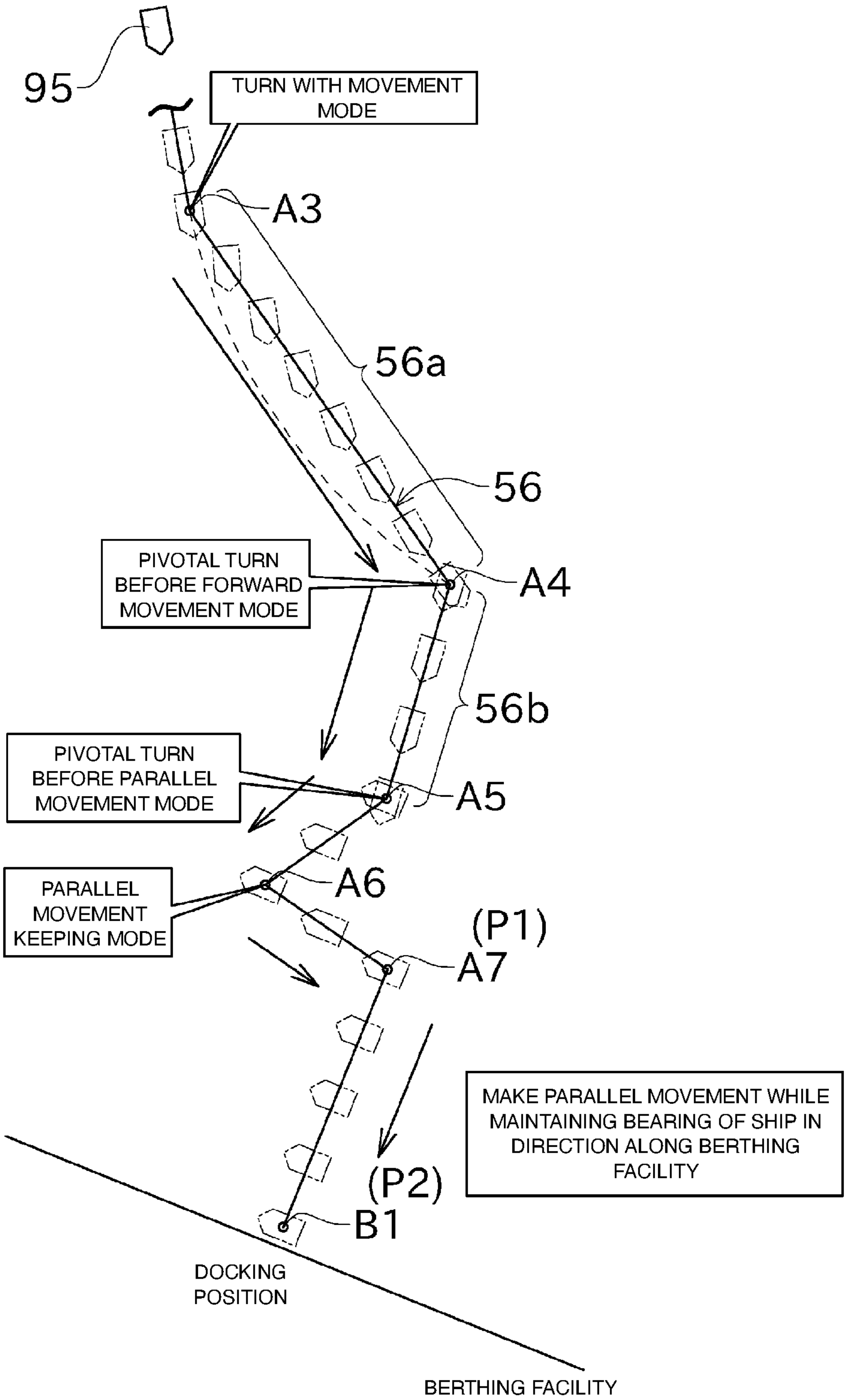
FIG. 5 is a schematic diagram illustrating how a ship changes a bearing while following via points on a route.

A user is able to setting, through the interface unit 81 to be described later, a point constituting a target for an actual automatic docking of the ship 95 (hereinafter also referred to as a docking point B1) in a position near the straight line 39 detected by the docking point setting unit 41. Taking the overall length of the ship 95 into consideration, the user sets the docking point B1 near a berthing facility deemed to allow docking (specifically, the straight line 39). In FIG. 5, an example of the docking point B1 is illustrated with a topography different from the topography in FIG. 2. The ship 95 docks in a direction along the direction of the berthing facility (direction of the straight line 39). During the docking, the user chooses where to direct the bow, that is to say, whether to berth the ship port or starboard.

To the docking point B1, information about a target position and a target bearing of the ship 95 in the docking position is given. Therefore, the docking point B1 essentially corresponds to the docking position for the ship 95.

The target position refers to a position targeted by the ship 95 under automatic navigation. The target bearing is a bearing targeted by the ship 95 under automatic navigation. A target comprehends, apart from the final target (the docking point B1), an intermediate target preceding the final target.

The route generation unit 51 calculates a route of the ship 95 to the docking point B1 based on an appropriate route search algorithm. For the calculation of the route, the local map 36 generated by the local map generator 32 and the wide area map generated by the wide area map generator 33 are both used. After completing the calculation of the route, the route generation unit 51 generates a plurality of via points A1, A2, . . . defining a route 56, as illustrated in FIG. 5. In addition, the route generation unit 51 sets information about the target position and the target bearing for each of the via points A1, A2, . . . .

The ship 95 is so controlled as to fulfill the target position and the target bearing at a point, such as the via points A1, A2, . . . and the docking point B1, and such point is also referred to as a control point in the following. The via points A1, A2, . . . are intermediate control points and the docking point B1 is the final control point. The route 56 is so set in a zigzag line form as to link the target positions at two or more control points in order.

Each control point includes the information about the target position and the target bearing. The automatic docking is managed so that the ship 95 may sequentially fulfill the target position and the target bearing at each control point in the order of control points on the route 56.

Figure 3:
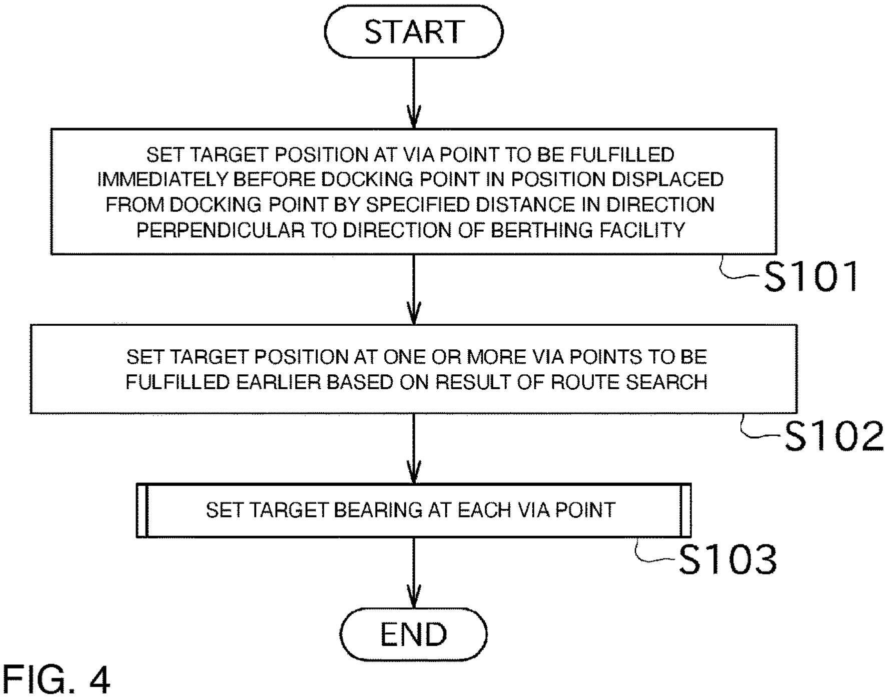
FIG. 3 is a flowchart illustrating processing to be performed by a route generation unit for the purpose of generating a route.
Figure 4:
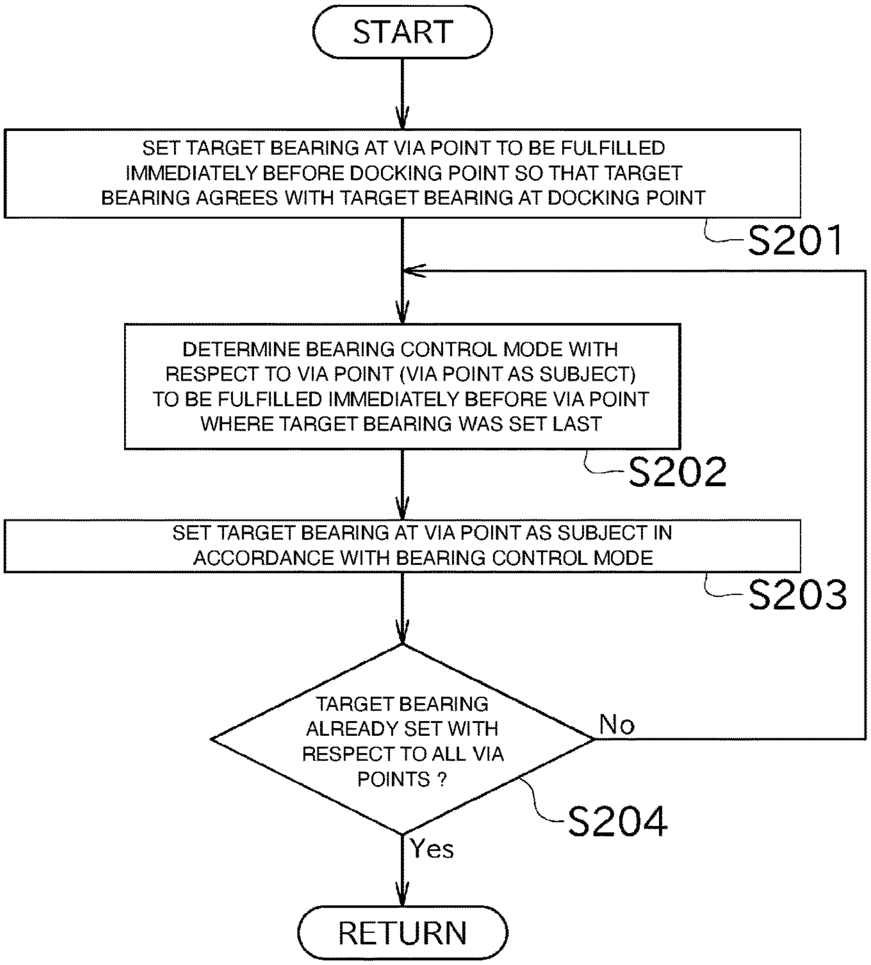
FIG. 4 is a flowchart illustrating a subroutine for setting a target bearing at via points.

Next, processing performed by the route generation unit 51 is described in detail. FIG. 3 is a flowchart illustrating processing to be performed by the route generation unit 51 for the purpose of generating the route 56. FIG. 4 is a flowchart illustrating a subroutine for setting the target bearing at the via points A1, A2, . . . .

When the docking point B1 has been set and the user has given instructions about the automatic docking through the interface unit 81, the route generation unit 51 starts the processing in FIG. 3.

As illustrated in FIG. 5, the route generation unit 51 generates the target position at a via point A7 in a position (first position P1) separated from the docking point B1 (second position P2) for the docking at a berthing facility by a specified distance in a direction perpendicular to the direction of the berthing facility (step S101 in FIG. 3).

The via point A7 is the (N−1)th control point if N control points are finally set and the docking point B1 is considered as the Nth control point. In other words, the via point A7 (the first position P1) set in step S101 is immediately before the docking point B1 (the second position P2) in the order to be fulfilled by the ship 95. The number of control points (that is to say, the number of the via points A1, A2, . . . ), however, is not settled yet in step S101 because the route 56 has not been determined.

Next, the route generation unit 51 calculates a route of the ship 95 to the via point A7 generated in step S101 based on an appropriate route search algorithm. For the calculation of the route, the wide area map generated by the wide area map generator 33 is used. While any rout search algorithm may be used, the A* algorithm is used in the present embodiment. Since the wide area map is two-dimensional, route search is performed in a two-dimensional manner.

In the route search, consideration is given to the overall length of the ship 95 as set in advance. As a result, it is possible to make a search taking an actual size of the ship into consideration. Among various methods for consideration, it is thinkable, for instance, to displace the region of the free space 37 as described before inward in an amount corresponding to the overall length and perform the route search based on the region after displacement.

In step S102, the route generation unit 51 generates one or more target positions of the ship 95 at the via points A1, A2, . . . so that the result of the route search may be represented by a zigzag line. In FIG. 5, the two via points A1 and A2 on the beginning end side are omitted. The via points A1, A2, . . . , and A6, for each of which the target position is set in step S102, correspond to the first through the (N−2)th control points, respectively, in the order of control points closer to a current position of the ship 95. The via points A1, A2, . . . , and A6 other than the via point A7 in the first position P1 each correspond to an intermediate position.

In step S102, the target position is settled at all the control points (the via points A1, A2, . . . and the docking point B1) and the route 56 is so set as to link the control points. In step S102, however, the target position at each of the via points A1, A2, . . . is only set and the target bearing is not set yet.

Next, the route generation unit 51 sets the target bearing for each of the via points A1, A2, . . . (step S103). In the present embodiment, the route generation unit 51 sets the target bearing for each of two or more via points A1, A2, . . . while appropriately changing a bearing setting mode to be described later.

The details of the process in step S103 are illustrated in FIG. 4 as a subroutine. When the process starts, the route generation unit 51 sets the target bearing at the via point A7 to be fulfilled immediately before the docking point B1 so that the set target bearing may be the same as the target bearing at the docking point B1 (step S201).

Next, the bearing setting mode, which is related to rules for the setting of the target bearing, is determined with respect to a via point An−1 just ahead of a via point An where the target bearing was set last (n being an integer) (step S202).

The bearing setting mode is selected from four modes below according to circumstances. In the following, detailed description is made on each bearing setting mode.

(1) A first bearing setting mode is a pivotal turn before parallel movement mode. In this mode, the ship 95, which has reached the via point An−1, temporarily stops and pivotally turns on the spot so as to cause the bearing of the ship 95 to agree with the target bearing at the next via point An. After completion of the turn in a stopping state, the ship 95 moves to the next via point An while maintaining the bearing after the turn. The pivotal turn before parallel movement mode is assumed to be implemented if the ship 95 is adequately close to the docking point B1 in an ending phase of the automatic docking.

(2) A second bearing setting mode is a pivotal turn before forward movement mode. In this mode, the ship 95, which has reached the via point An−1, temporarily stops and pivotally turns on the spot so as to cause the bearing of the ship 95 to agree with a bearing directed to the next via point An. After completion of the turn in a stopping state, the ship 95 moves to the next via point An while maintaining the bearing after the turn. During such movement, the ship 95 essentially moves forward. The pivotal turn before forward movement mode is assumed to be implemented in an early phase through a middle phase of the automatic docking.

(3) A third bearing setting mode is a parallel movement keeping mode. In this mode, the ship 95, which has reached the via point An−1 (in the pivotal turn before parallel movement mode or the parallel movement keeping mode), moves to the next via point An while maintaining the bearing of the ship 95 at that time as is. The parallel movement keeping mode is assumed to be implemented in an ending phase of the automatic docking, as is the case with the pivotal turn before parallel movement mode.

(4) A fourth bearing setting mode is a turn with movement mode. In this mode, the ship 95, which has reached the via point An−1, moves toward the next via point An. In the course of such movement, the ship 95 turns so as to cause the bearing of the ship 95 to agree with the target bearing at the next via point An. In the turn with movement mode, the movement and the turn of the ship 95 are attained concurrently, so that the ship 95 moves quickly as compared with the pivotal turn before parallel movement mode and the pivotal turn before forward movement mode. The turn with movement mode is assumed to be implemented in an early phase through a middle phase of the automatic docking.

Which is to be selected from among the four bearing setting modes is determined taking account of the position of the via point An−1, how sharply the route bends at the via point An−1, and the like.

If the direct distance or distance on the route between the via point An−1 as a subject of determination and the docking point B1 is shorter than a specified distance, for instance, the parallel movement keeping mode is selected. The parallel movement keeping mode may be selected if the direct distance or distance on the route between the via point An−1 as a subject of determination and the via point A7, at which the target bearing is set in step S202, is shorter than a specified distance.

At a via point A5 that is a first via point where the above distance is equal to or longer than a specified distance when the route is followed from the docking point B1, the pivotal turn before parallel movement mode is selected.

If the via point An−1 as a subject of determination is more distant from the docking point B1, it is determined whether the direction of the route 56 significantly changes at the via point An−1. If the direction of the route 56 changes by an angle equal to or larger than a specified angle, the pivotal turn before forward movement mode is selected at the via point An−1. Otherwise the turn with movement mode is selected at the via point An−1.

Next, the route generation unit 51 finds the target bearing at the via point An−1 as a subject in accordance with the selected bearing setting mode (step S203). A specific process is as follows.

(1) In the pivotal turn before parallel movement mode, the target bearing at the via point An−1 as a subject is so set as to agree with a bearing directed from a via point An−2 immediately before the via point An−1 as a subject to the via point An−1 as a subject. The route generation unit 51, however, inserts a control point to be fulfilled immediately after the via point An−1 as a subject (hereinafter also referred to as a transition point) into the route 56. The target position at the transition point is identical to the target position at the via point An−1 as a subject. The target bearing at the transition point is so set as to agree with the target bearing at the via point An immediately after the transition point.

(2) In the pivotal turn before forward movement mode, the target bearing at the via point An−1 as a subject is so set as to agree with a bearing directed from the via point An−2 immediately before the via point An−1 as a subject to the via point An−1 as a subject, as is the case with the pivotal turn before parallel movement mode. The route generation unit 51, however, inserts the control point to be fulfilled immediately after the via point An−1 as a subject (transition point) into the route 56. The target position at the transition point is identical to the target position at the via point An−1 as a subject. The target bearing at the transition point is so set as to agree with a bearing directed from the via point An−1 as a subject to the via point An immediately after the transition point.

(3) In the parallel movement keeping mode, the target bearing at the via point An−1 as a subject is so set as to agree with the target bearing at the via point An immediately after the via point An−1 as a subject.

(4) In the turn with movement mode, the target bearing at the via point An−1 as a subject is so set as to agree with a bearing directed from the via point An−2 immediately before the via point An−1 as a subject to the via point An−1 as a subject.

After setting the target bearing at one via point An−1 as described above, the route generation unit 51 determines whether the target bearing has been set with respect to all the via points A1, A2, . . . , and A7 (step S204). If, among the via points A1, A2, . . . , and A7, there remains a via point where the target bearing is not set yet, the processing returns to step S202.

In the pivotal turn before parallel movement mode and the parallel movement keeping mode, the target bearing at the via point An−1 as a subject is dependent on the target bearing at the via point An immediately after the via point An−1 as a subject. For this reason, in the flowchart in FIG. 4, the target bearings at the via points A1, A2, . . . , and A7 are found in the order of via points closer to the docking point B1 (that is to say, in an order reverse to the order of via points followed by the ship 95).

If it is determined in step S204 that the target bearing has been set with respect to all the via points A1, A2, . . . , and A7, the processing withdraws from the subroutine and returns to a main routine illustrated in FIG. 3. Then, the processing ends in the main routine.

An example of the route 56 generated by the processing as described above is illustrated in FIG. 5. As seen from the illustrated example, the ship 95 makes a parallel movement in positions on the whole route 56 that are close to the docking position (that is to say, from the via point A5 to the docking point B1) while maintaining the bearing of the ship 95 in the direction along the berthing facility.

In a section 56*a* where the turn with movement mode is employed, the ship 95 turns while moving. Consequently, the turn with movement mode is suitable for a quick movement. It, however, is highly possible that an actual movement locus of the ship 95 does not have such a linear form as indicated by the route 56 in FIG. 5 but curves off as illustrated with a broken line because the ship 95 moves and turns concurrently in the section 56*a*.

On the other hand, at a via point A4 where the pivotal turn before forward movement mode has been selected, the ship 95 is temporarily stopped at the via point A4 and caused to turn toward the next via point A5 so as to adjust the bearing of the ship 95 before the ship 95 is caused to move to the next via point A5. As a result, the curving off of the movement locus of the ship 95 is suppressed in a section 56*b*. The pivotal turn before forward movement mode is suitable for the navigation in an intricate spot.

Figure 6:
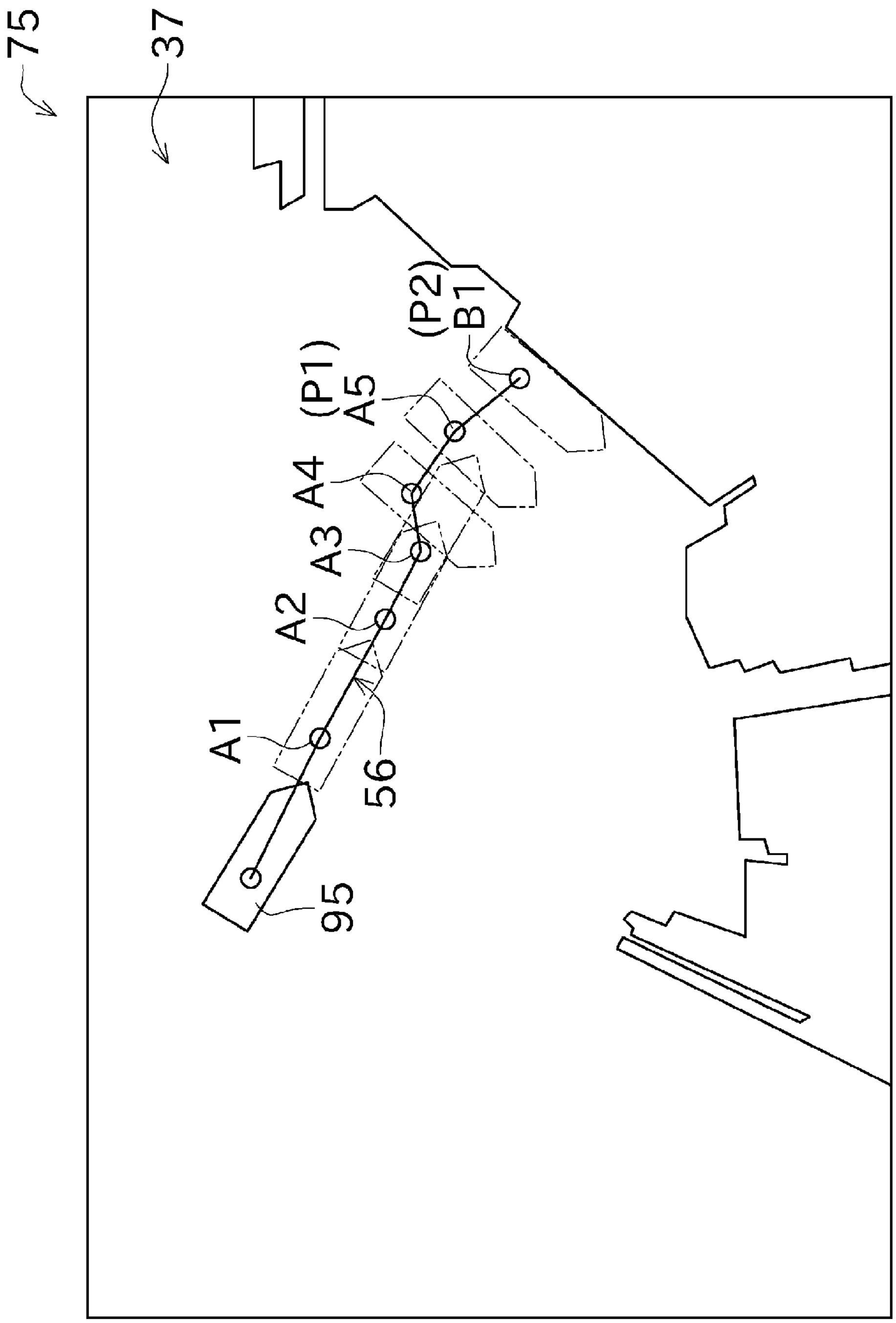
FIG. 6 is a diagram illustrating an example of display contents of a display device based on display data.

The display data generation unit 71 in FIG. 1 is capable of generating display data for displaying the current position of the ship 95, the environmental map, the docking position, and the like. Illustrated in FIG. 6 is an exemplary display of a display device based on the display data described below. The display data may be data for indicating the ship 95 in the current position with a symbolic figure, indicating the route 56 with a zigzag line, and indicating the position and direction to be fulfilled by the ship at each of the via points A1, A2, . . . and the docking point B1 (including the first position P1 and the second position P2) with a figure. In that case, the user is able to readily grasp the behavior of the ship 95 during the automatic docking beforehand by seeing an image on the display device.

The interface unit 81 in FIG. 1 has a user interface function with the ship steering management system 1. The interface unit 81 may have a configuration including a display device and an input device. In that case, the user is able to input instructions by referring to the display contents of the display device and operating the input device. The input device may be a keyboard, a mouse or a touch panel.

The management controller 3 is a computer including a CPU, a ROM, and a RAM. In the ROM, a program for managing an action of the propulsion apparatus 5 (action of the screws 6L and 6R arranged on the left and the right, respectively, in the present embodiment) is stored. The management controller 3 controls the propulsion apparatus 5 in accordance with the program.

The ship 95 is equipped with a steering device 91 for steering the ship 95. When the user operates the steering device 91, the contents of operation on the steering device 91 are output to the management controller 3. The management controller 3 manages the action of the propulsion apparatus 5 according to the input contents of operation. Consequently, the user is able to manually navigate the ship 95 by operating the steering device 91. The steering device 91 may be a handle, a control lever or a joystick.

If the route controller 2 generates the route 56, the management controller 3 is able to use the target positions and the target bearings, which have been set with respect to the control points (namely, the via points A1, A2, . . . , the docking point B1, and the transition point), respectively, to allow the automatic navigation of the ship 95. When the management controller 3 carries out the automatic navigation, the via points A1, A2, . . . and the transition point are identically treated.

The automatic navigation (automatic docking) is carried out as described below. The management controller 3 sets the control point, which is closest to the beginning end of the route 56, as a control point of interest. The management controller 3 calculates a thrust of the ship 95 that is required for removing the difference between the current position of the ship 95 and the target position at the control point of interest. The management controller 3 also calculates a turning round moment of the ship 95 that is required for removing the difference between the current bearing of the ship 95 and the target bearing at the control point of interest. Then, the management controller 3 gives instructions to fulfill the found thrust and turning round moment to the propulsion apparatus 5. When the current position of the ship 95 agrees with the target position at the control point of interest and the current bearing of the ship 95 agrees with the target bearing at the control point of interest, the management controller 3 sets the control point to be fulfilled next to the current control point of interest on the route 56 as a new control point of interest. Repeating the processing as above makes it possible to appropriately control the bearing of the ship 95 and cause the ship 95 to automatically navigate to the docking point B1 in accordance with the route 56.

The management controller 3 may calculate the speed and the angular velocity of the ship 95 from the change in position of the ship 95 and use the data as calculated to perform speed control. The change in position of the ship 95 is found from position data of the ship 95 acquired by the GNSS device 12 at brief intervals, for instance.

Figure 7:
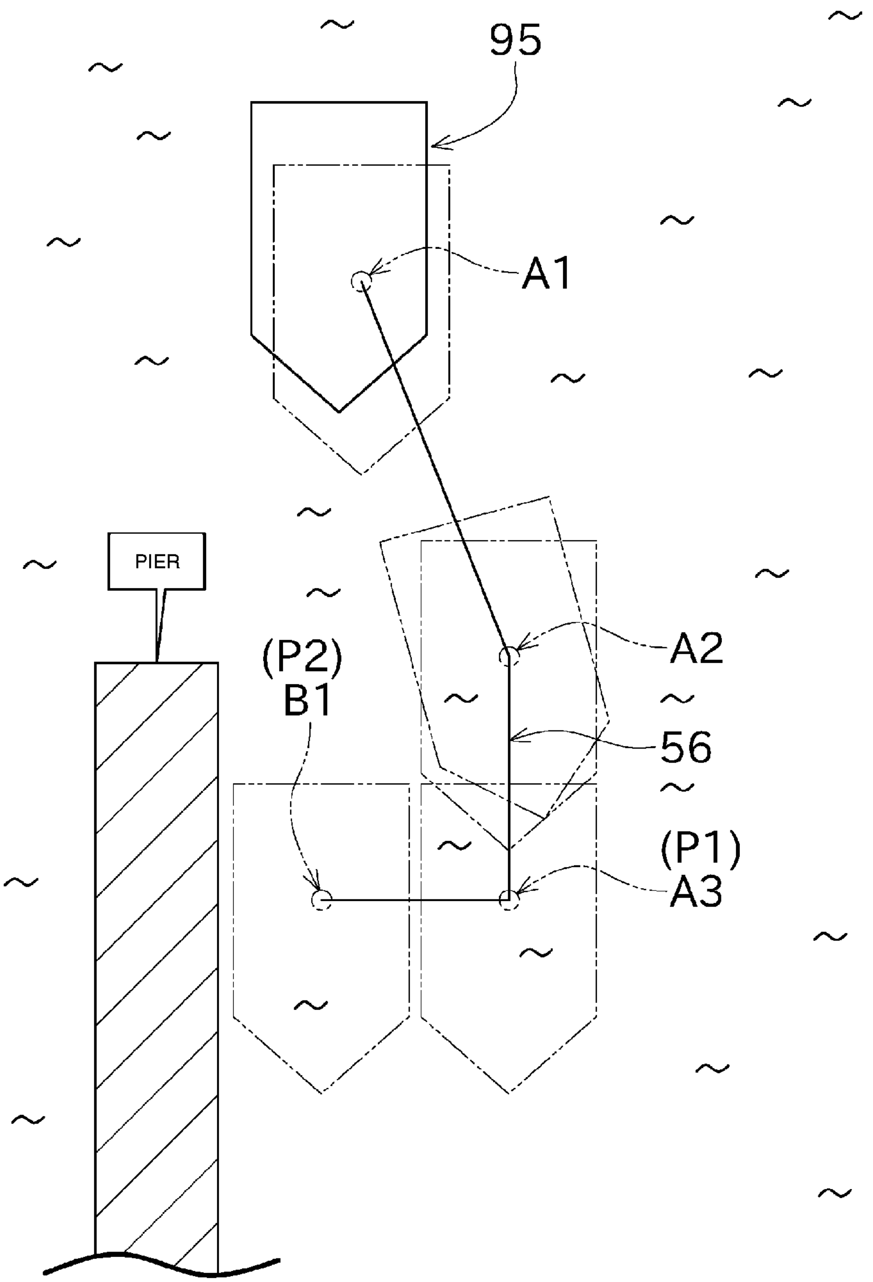
FIG. 7 is a schematic diagram illustrating an exemplary motion of a ship during automatic docking.

Referring to FIG. 7, an example of automatic docking is described. FIG. 7 is a diagram illustrating an exemplary motion of the ship 95 during the automatic docking.

In the example illustrated in FIG. 7, the docking point B1 (the second position P2) is set near a pier as a berthing facility. In a position displaced from the docking point B1 by an appropriate distance in the direction perpendicular to the direction of the pier, a via point A3 (the first position P1) to be fulfilled immediately before the docking point B1 is set. The target bearing at the via point A3 is identical to the target bearing at the docking point B1. The via point A3 is preceded by a plurality of via points A1 and A2.

In this example, the ship 95 as instructed to automatically dock moves while turning after reaching the first via point A1 so as to reach the next via point A2. At the via point A2, the ship 95 temporarily stops and pivotally turns so as to have a bearing identical to the target bearing at the next via point A3. Then, the ship 95 makes a parallel movement from the via point A2 toward the next via point A3. Next, the ship 95 makes a parallel movement from the via point A3 toward the docking point B1 while maintaining the current bearing.

Thus in the present embodiment, when the ship 95 moves to the via point A2, the via point A3, and the docking point B1 in this order, the ship 95 does not turn concurrently with a parallel movement but only makes a parallel movement. Consequently, the influence of a cross fluid force (called crossflow) generated when a turn and a parallel movement are concurrently made is prevented. If a turn and a parallel movement are concurrently made, with respect to the thrust generated by the propulsion apparatus 5, which can be grasped as separated into the thrust for a turn and the thrust for a parallel movement, an actual bearing of the ship 95 differs from an intended bearing due to the control delay of a turn and, accordingly, an actual direction of the thrust generated by the ship 95 for a parallel movement is also deviated from the intended bearing. In the present embodiment, the influence of such deviation is suppressed because the ship 95 only makes a parallel movement, so that the path of the ship 95 is prevented from curving off. As a result, the automatic docking is achieved with high accuracy so that the ship 95 may not come off the route 56 considerably.

When the automatic docking is carried out in the situation illustrated in FIG. 7, a route that allows the ship 95 illustrated with a solid line to simply advance to reach the docking point B1 is also thinkable. In that case, however, the ship 95 navigates in close vicinity to the pier, so that there is a possibility that the pier collides with the starboard. In the present embodiment, the route 56 is so formed as to pass through the via point A3, which is displaced from the docking point B1 by a specified distance in the direction perpendicular to the direction of the pier. The automatic docking management carried out in accordance with such detouring route 56 reduces the possibility of collision against the pier.

As described above, the route controller 2 in the present embodiment generates the route 56, which allows the ship 95 to dock at the berthing facility. The route 56 includes the first position P1 and the second position P2. The first position P1 is a via point displaced from the docking point B1 (the second position P2) for the ship 95 in the berthing facility by a specified distance in the direction perpendicular to the direction of the berthing facility (the via point A7 in the example in FIG. 5, the via point A5 in the example in FIG. 6 or the via point A3 in the example in FIG. 7). The second position P2 is the docking point B1 for the ship 95 in the berthing facility. The route 56 is generated so that the ship 95 may move from the first position P1 to the second position P2 while maintaining the bearing of the ship 95 in the direction along the berthing facility.

As a result, the ship 95 is allowed to come closer to the second position P2 from the first position P1 perpendicularly to the direction of the berthing facility while making the bearing of the ship 95 coincident with the direction along the berthing facility. Consequently, the automatic docking of the ship 95 is achieved with high accuracy while reducing the possibility of collision against the berthing facility.

In the example in FIG. 5, for instance, the route 56 is so generated as to link a plurality of positions. The first position P1 is immediately before the second position P2 in the order to be fulfilled by the ship 95.

It is therefore possible to fulfill the route 56 for automatic docking, which is simple.

In the example in FIG. 5, for instance, the route 56 includes one or more via points A1, A2, . . . , and A6. The via points A1, A2, . . . , and A6 precede the via point A7 (the first position P1) in the order to be fulfilled by the ship 95. The route controller 2 is capable of generating the route 56 while changing the bearing setting mode. The bearing setting mode includes the pivotal turn before parallel movement mode and the turn with movement mode. In the pivotal turn before parallel movement mode, the ship 95, which has reached the via point An−1, pivotally turns at the via point An−1 so as to cause the bearing of the ship 95 to agree with the bearing to be fulfilled by the ship 95 at the next via point An and moves to the next via point An while maintaining the bearing after turning. In the turn with movement mode, the ship 95, which has reached the via point An−1, turns concurrently with the movement from the via point An−1 to the next via point An so as to cause the bearing of the ship 95 to agree with the bearing to be fulfilled by the ship 95 at the next via point An.

It is therefore possible to generate the route 56, which allows the automatic docking of the ship 95, while making a change from the parallel movement after completion of a turn to the movement with a turn, or vice versa according to circumstances.

In the route controller 2 in the present embodiment, the bearing setting mode includes the pivotal turn before forward movement mode. In the pivotal turn before forward movement mode, the ship 95, which has reached the via point An−1, pivotally turns at the via point An−1 so as to cause the bearing of the ship 95 to agree with the bearing directed to the next via point An and moves to the next via point An while maintaining the bearing after turning.

It is therefore possible to generate the route 56, which allows the automatic docking of the ship 95, while carrying out the forward movement after completion of a turn according to circumstances.

In the route controller 2 in the present embodiment, the bearing setting mode is changed based on the direct distance between the via point An−1 and the second position P2 or the direct distance between the via point An−1 and the first position P1.

The bearing setting mode may be changed based on the distance on the route 56 between the via point An−1 and the second position P2 or the distance on the route 56 between the via point An−1 and the first position P1.

Such change in bearing setting mode makes it possible to change the control of the bearing of the ship 95 between an ending phase of the automatic docking that needs a high-accuracy control of the bearing of the ship 95 and a phase preceding the ending phase.

In the route controller 2 in the present embodiment, the bearing setting mode is changed based on at least the magnitude of change of the direction of the route 56 at the via point An−1.

Such change in bearing setting mode makes it possible to prevent the movement locus of the ship 95 from considerably coming off the route 56 even if the route 56 sharply bends at the via point An−1.

The route controller 2 in the present embodiment includes the display data generation unit 71. The display data generation unit 71 generates display data 75 for displaying, with a figure, the first position P1 and the second position P2 as well as directions to be fulfilled by the ship 95 in the first position P1 and the second position P2, respectively.

As a result, the user is able to readily grasp the behavior of the ship 95 involved in the automatic docking by checking the display.

A preferred embodiment of the present invention has been described above, and the configuration as above may be modified as follows.

The route generation unit 51 may generate the route 56 so that the ship 95 may make a parallel movement through the entire route 56 from the beginning end to the terminating end (the docking point B1).

Selection of the bearing setting mode may be performed taking account of whether the free space 37 is widely ensured around the route 56.

The ship steering management system 1 may acquire attitude data from, for instance, an IMU appropriately installed on the ship 95 and use the attitude data to manage the motion of the ship 95.

To the position and bearing information input unit 22, data on the current bearing of the ship 95 that is retrieved from the GNSS device 12 and the IMU may be input.

The wide area map generator 33 may acquire the local map 36 and use the data on the local map 36 to generate a wide area map. The wide area map may appropriately be updated using the local map 36.

The map generation unit 31 may generate an environmental map obtained by coordinate transformation based on an appropriate technique. As an example, the local map generator 32 may use information about the installation position and the bearing of the LiDAR 11 to generate the local map 36, which is obtained by the coordinate transformation from the LiDAR coordinate system to the GNSS coordinate system. The local map generator 32 may also use GNSS latitudinal and longitudinal data to generate the local map 36, which is obtained by the coordinate transformation from the GNSS coordinate system to the NEU Cartesian coordinate system.

In the embodiment as described above, the screws 6L and 6R are changeable in direction of the rotation axis independently of each other. The system of the propulsion apparatus 5, however, can be changed to any other system as long as a parallel movement in the lateral direction, a pivotal turn on the spot, and the like of the ship 95 are essentially fulfilled. It is thinkable as an example that the propulsion apparatus 5 is composed of a pair of screws arranged on the left and the right, respectively, that are each unchangeable in direction of the rotation axis, a rudder, and a side thruster provided on the bow side. The propulsion apparatus 5 may be composed of a single screw unchangeable in direction of the rotation axis, a rudder, and side thrusters provided on the bow side and the stern side, respectively.

DESCRIPTION OF REFERENCE NUMERALS

1 Ship steering management system
2 Route controller (route generation device)
P1 First position
P2 Second position

The invention claimed is:

1. A route generation device that generates a route allowing a ship to dock automatically at a berthing facility, the route including:

one or more intermediate positions, the intermediate positions preceding a first position in an order to be fulfilled by the ship, the first position as a position displaced from a docking position for the ship in the berthing facility by a specified distance in a direction perpendicular to a direction of the berthing facility; and a second position as the docking position for the ship in the berthing facility, wherein the route is generated so that the ship moves automatically from the first position to the second position while maintaining the bearing of the ship parallel with the direction of the berthing facility, and the route is generated while changing a bearing setting mode at the intermediate positions, the bearing setting mode including at least one of:

a pivotal turn before parallel movement mode, in which the ship having reached the intermediate positions pivotally turns in the intermediate positions so as to cause the bearing of the ship to agree with a bearing to be fulfilled by the ship in a next position and moves to the next position while maintaining a bearing after turning, a turn with movement mode, in which the ship having reached the intermediate positions turns concurrently with movement from the intermediate positions to the next position so as to cause the bearing of the ship to agree with the bearing to be fulfilled by the ship in the next position; and a pivotal turn before forward movement mode, in which the ship having reached the intermediate positions pivotally turns in the intermediate positions so as to cause the bearing of the ship to agree with a bearing directed to the next position and moves to the next position while maintaining a bearing after turning.

2. The route generation device according to claim 1, wherein:

the route is so generated as to link a plurality of positions, and the first position is immediately before the second position on the route in an order to be fulfilled by the ship.

3. A route generation device that generates a route allowing a ship to dock automatically at a berthing facility, the route including:

one or more intermediate positions, the intermediate positions preceding a first position in an order to be fulfilled by the ship, the first position as a position displaced from a docking position for the ship in the berthing facility by a specified distance in a direction perpendicular to a direction of the berthing facility; and a second position as the docking position for the ship in the berthing facility, wherein the route is generated so that the ship moves automatically from the first position to the second position while maintaining the bearing of the ship parallel with the direction of the berthing facility, and the route is generated while changing a bearing setting mode at the intermediate positions, the bearing setting mode including:

a pivotal turn before parallel movement mode, in which the ship having reached the intermediate positions pivotally turns in the intermediate positions so as to cause the bearing of the ship to agree with a bearing to be fulfilled by the ship in a next position and moves to the next position while maintaining a bearing after turning, a turn with movement mode, in which the ship having reached the intermediate positions turns concurrently with movement from the intermediate positions to the next position so as to cause the bearing of the ship to agree with the bearing to be fulfilled by the ship in the next position; and a pivotal turn before forward movement mode, in which the ship having reached the intermediate positions pivotally turns in the intermediate positions so as to cause the bearing of the ship to agree with a bearing directed to the next position and moves to the next position while maintaining a bearing after turning.

4. A route generation device that generates a route allowing a ship to dock automatically at a berthing facility, the route including:

one or more intermediate positions, the intermediate positions preceding a first position in an order to be fulfilled by the ship, the first position as a position displaced from a docking position for the ship in the berthing facility by a specified distance in a direction perpendicular to a direction of the berthing facility; and a second position as the docking position for the ship in the berthing facility, wherein the route is generated so that the ship moves automatically from the first position to the second position while maintaining the bearing of the ship parallel with the direction of the berthing facility, and the route is generated while changing a bearing setting mode at the intermediate positions, the bearing setting mode including:

a pivotal turn before parallel movement mode, in which the ship having reached the intermediate positions pivotally turns in the intermediate positions so as to cause the bearing of the ship to agree with a bearing to be fulfilled by the ship in a next position and moves to the next position while maintaining a bearing after turning, a turn with movement mode, in which the ship having reached the intermediate positions turns concurrently with movement from the intermediate positions to the next position so as to cause the bearing of the ship to agree with the bearing to be fulfilled by the ship in the next position, a pivotal turn before forward movement mode, in which the ship having reached the intermediate positions pivotally turns in the intermediate positions so as to cause the bearing of the ship to agree with a bearing directed to the next position and moves to the next position while maintaining a bearing after turning; and a parallel movement keeping mode, in which the ship having reached the intermediate positions moves to the next position in a parallel direction to the berthing facility while maintaining the same bearing of the ship.

5. The route generation device according to claim 2, wherein the bearing setting mode is changed based on at least a direct distance between the intermediate positions and the second position or a direct distance between the intermediate positions and the first position.

6. The route generation device according to claim 2, wherein the bearing setting mode is changed based on at least a distance on the route between the intermediate positions and the second position or a distance on the route between the intermediate positions and the first position.

7. The route generation device according to claim 2, wherein the bearing setting mode is changed based on at least a magnitude of change of a direction of the route in the intermediate positions.

8. The route generation device according to claim 1, comprising a display data generation unit that generates display data for displaying, with a figure, the first position and the second position as well as directions to be fulfilled by the ship in the first position and the second position, respectively.

9. The route generation device according to claim 2, wherein in adjusting the bearing setting mode, a target position at each intermediate position is determined first, and then a target bearing is determined.

* * * * *